United States Patent [19]
Tsenter

[11] Patent Number: 6,043,631
[45] Date of Patent: Mar. 28, 2000

[54] BATTERY CHARGER AND METHOD OF CHARGING RECHARGEABLE BATTERIES

[75] Inventor: Boris Tsenter, Norcross, Ga.

[73] Assignee: Total Battery Management, Inc., Chamblee, Ga.

[21] Appl. No.: 09/002,329

[22] Filed: Jan. 2, 1998

[51] Int. Cl.[7] ................................................. H01M 7/40
[52] U.S. Cl. ......................................... 320/148; 320/161
[58] Field of Search ..................................... 320/148, 161

[56] References Cited

U.S. PATENT DOCUMENTS

| | | | |
|---|---|---|---|
| 3,487,284 | 12/1969 | Cady | 320/20 |
| 3,890,556 | 6/1975 | Melling et al. | 330/21 |
| 3,911,349 | 10/1975 | Seeley et al. | 320/20 |
| 3,911,350 | 10/1975 | Swope | 320/22 |
| 3,953,302 | 4/1976 | Rao et al. | 204/14 N |
| 4,016,473 | 4/1977 | Newman | 320/14 |
| 4,079,303 | 3/1978 | Cox | 320/17 |
| 4,086,525 | 4/1978 | Ibsen et al. | 320/33 |
| 4,139,680 | 2/1979 | Schlaikjer | 429/50 |
| 4,345,008 | 8/1982 | Breault | 429/26 |
| 4,385,269 | 5/1983 | Aspinwall et al. | 320/14 |
| 4,388,582 | 6/1983 | Saar et al. | 320/20 |
| 4,392,101 | 7/1983 | Saar et al. | 320/20 |
| 4,414,291 | 11/1983 | Breault | 429/14 |
| 4,554,500 | 11/1985 | Sokira | 320/31 |
| 4,560,937 | 12/1985 | Finger | 324/433 |
| 4,680,528 | 7/1987 | Mikami et al. | 320/32 |
| 4,725,784 | 2/1988 | Peled et al. | 324/427 |
| 4,746,854 | 5/1988 | Baker et al. | 320/40 |
| 4,761,487 | 8/1988 | Godshall | 429/112 |
| 4,806,840 | 2/1989 | Alexander et al. | 320/20 |
| 5,017,856 | 5/1991 | Johnson, Jr. | 320/2 |
| 5,057,762 | 10/1991 | Goedken et al. | 320/15 |
| 5,119,009 | 6/1992 | McCaleb et al. | 320/13 |
| 5,132,626 | 7/1992 | Limuti et al. | 324/432 |
| 5,143,799 | 9/1992 | Tsenter | 429/9 |
| 5,157,320 | 10/1992 | Kuriloff | 320/39 |
| 5,166,596 | 11/1992 | Goedken | 320/35 |

(List continued on next page.)

OTHER PUBLICATIONS

Damon W. Chu, "Tradeoffs in Implementing Intelligent Battery Management", Jul. 10, 1995, 6 pgs.

David Freeman, "Freeing Portables from Battery Tyranny," Jul. 10, 1995, 6 pgs.

*Primary Examiner*—Peter S. Wong
*Assistant Examiner*—Gregory J. Toatley, Jr.
*Attorney, Agent, or Firm*—Reed Smith Shaw & McClay LLP; Raymond A. Miller

[57] ABSTRACT

A method of charging a rechargeable battery which comprises charging the battery with a charging current; sampling a charging voltage of the battery during charging to recognize potential adverse conditions within the battery; interrupting the charging current periodically to create current-free periods and sampling an open circuit voltage of the battery at a plurality of points during each current-free period to identify potential overcharge conditions in the battery; lowering the charging current if any of the above-identified adverse conditions are identified and continuing charging with the charging current if the potential adverse charging condition is not identified; and terminating charging when a negative slope on a chemical polarization versus time curve is identified below a pre-determined minimum level. The battery charger and method of the present invention may also be utilized to determine the type, design, and chemistry of the battery being charged based on pre-determined chemical polarization values.

19 Claims, 5 Drawing Sheets

U.S. PATENT DOCUMENTS

| | | | |
|---|---|---|---|
| 5,179,335 | 1/1993 | Nor | 320/21 |
| 5,200,689 | 4/1993 | Interiano et al. | 320/20 |
| 5,206,578 | 4/1993 | Nor | 320/14 |
| 5,237,257 | 8/1993 | Johnson et al. | 320/2 |
| 5,278,000 | 1/1994 | Huang et al. | 429/91 |
| 5,290,640 | 3/1994 | Tsenter et al. | 429/9 |
| 5,291,117 | 3/1994 | Rydborn . | |
| 5,296,997 | 3/1994 | Betton et al. . | |
| 5,304,915 | 4/1994 | Sanpei et al. | 320/14 |
| 5,304,917 | 4/1994 | Somerville | 320/32 |
| 5,307,000 | 4/1994 | Podrazhansky et al. | 320/14 |
| 5,321,347 | 6/1994 | Chien | 320/21 |
| 5,329,219 | 7/1994 | Garrett | 320/22 |
| 5,330,861 | 7/1994 | Fetcenko et al. | 429/57 |
| 5,331,268 | 7/1994 | Patino et al. | 320/20 |
| 5,343,380 | 8/1994 | Champlin | 363/46 |
| 5,349,281 | 9/1994 | Bugaj | 320/14 |
| 5,350,995 | 9/1994 | Iketani | 320/15 |
| 5,350,996 | 9/1994 | Tauchi | 320/22 |
| 5,352,967 | 10/1994 | Nutz et al. | 320/20 |
| 5,365,160 | 11/1994 | Leppo et al. | 320/22 |
| 5,369,364 | 11/1994 | Renirie et al. | 324/430 |
| 5,376,873 | 12/1994 | Toya | 320/20 |
| 5,391,193 | 2/1995 | Thompson | 607/29 |
| 5,396,163 | 3/1995 | Nor et al. | 320/21 |
| 5,408,170 | 4/1995 | Umetsu et al. | 320/148 |
| 5,411,537 | 5/1995 | Munshi et al. | 607/33 |
| 5,412,306 | 5/1995 | Meadows et al. | 320/20 |
| 5,418,084 | 5/1995 | Georgopoulos | 429/54 |
| 5,422,559 | 6/1995 | Hall et al. | 320/21 |
| 5,432,029 | 7/1995 | Mitate et al. | 429/194 |
| 5,432,426 | 7/1995 | Yoshida | 320/20 |
| 5,432,429 | 7/1995 | Armstrong, II et al. | 320/43 |
| 5,440,221 | 8/1995 | Landau et al. | 320/22 |
| 5,442,274 | 8/1995 | Tamai | 320/23 |
| 5,444,353 | 8/1995 | Shinohara | 320/39 |
| 5,449,996 | 9/1995 | Matsumoto et al. | 320/20 |
| 5,449,997 | 9/1995 | Gilmore et al. . | |
| 5,460,899 | 10/1995 | Charkey | 429/59 |
| 5,467,005 | 11/1995 | Matsumoto et al. | 320/20 |
| 5,477,125 | 12/1995 | Ettel et al. | 320/156 |
| 5,483,165 | 1/1996 | Cameron et al. | 324/427 |
| 5,489,836 | 2/1996 | Yuen | 320/32 |
| 5,498,492 | 3/1996 | Hara et al. | 429/212 |
| 5,500,583 | 3/1996 | Buckley et al. | 320/14 |
| 5,541,492 | 7/1996 | Fernandez | 320/147 |
| 5,729,116 | 3/1998 | Tsenter | 320/30 |
| 5,900,718 | 5/1999 | Tsenter | 320/151 |

BATTERY CHARGER AND METHOD OF CHARGING RECHARGEABLE BATTERIES

BACKGROUND OF THE INVENTION

1. Field of the Invention

This invention relates generally to a battery charger and a method of charging a rechargeable battery, specifically alkaline secondary batteries, Ni—Cd (Nickel-Cadmium), Ni—$H_2$ (Nickel-Hydrogen) and Ni—MeH (Nickel-Metal Hydride) batteries which utilize an inflection in chemical polarization voltage as a signal to terminate charging.

2. Background and Description of the Related Art

A large number of portable electronic devices, e.g. cellular phones, two-way radios, laptop computers and camcorders, are in widespread use. In addition, portable electronic devices have become more common in the aerospace industry. With growing use of these devices, it has become necessary to provide a rechargeable battery that is in a continuous state of operational readiness. In this regard, it is preferable to utilize a rechargeable battery that uses a method of recharging that avoids both under- and overcharging.

Overcharge conditions are undesirable and disadvantageous to cycle life of the battery. Overcharge reactions in vented cells result in electrolysis and loss of water that must be replaced; in sealed cells, overcharge reactions create pressure and heat since the recombination reactions of gases produced during overcharge are exothermic.

Overcharge reactions that result from high charging voltage can be prevented by simply limiting the charging voltage to a certain value. This simple approach is, unfortunately, only partially successful with certain cell types, e.g., lead-acid cells, vented Nickel-Cadmium cells, and sealed lithium ion cells.

Despite the adverse consequences of overcharging, in conventional charging methods, overcharge reactions are tolerated to complete the charging process. Sealed cells capable of recombining the overcharge reaction products are able to tolerate overcharge at low rates because the pressures of by-product gases are low and the heat generation is slow enough that the generated heat can be easily dissipated and lost. If no electrolyte constituent is lost, it is less crucial to terminate charging. However, continuous overcharge, even at low rates, reduces the life cycle of the cells.

Rapid charging, i.e., charging in less than one hour, presents much more of a challenge in both vented and sealed cells. The first problem results from the limited rate of charge distribution or equilibration within the electrode plates. Also, at higher charge rates, the overcharge reactions begin to appear at a lower fraction of full charge. When overcharge reactions appear, the efficiency of the charge reactions declines and much of the columbic energy is wasted on the overcharge reactions. The rapid heating of a battery during high-rate overcharge may cause safe pressure limits to be exceeded, as well as cell venting.

U.S. Pat. No. 5,352,967, which is hereby incorporated herein by reference in its entirety, provides a good summary of some of the known methods of charging storage batteries. Most methods of charging sealed Ni-Cad and NiMH batteries use voltage and temperatures as parameters for terminating the charging phase. The methods disclosed therein focus on various techniques of determining proper charge termination and include: constant current mode; delta temperature/delta time mode (dT/dt); negative delta voltage charge mode ($-\Delta V$); positive delta voltage or delta voltage/delta time mode (dV/dt); pulse charge mode; and reflex mode.

In the constant current charge mode, the battery is continuously overcharged with a low current. Although the expenditure for a constant current source is relatively low, the long charging time causes damage to the cell. In the constant charge mode, it is customary to restrict the charging time. Therefore, as soon as a selected time has elapsed, the charging operation is terminated. Accordingly, since the constant current charge mode does not take into account the charge condition or chemical makeup of the cell, under- or overcharging of the cell can result.

In delta temperature/delta time charging (dT/dt), the charging current is switched off once the cell has reached a predetermined slope in the temperature versus time curve for the cell. This method can generate incorrect termination signals. The charging process may be terminated prior to the battery being fully charged if the preset value of dT/dt is too low, or, conversely, the charging process may be terminated too late if the value of dT/dt is too large.

In the negative delta voltage charge mode, a negative slope in the charge curve (dV/dt<0), which appears after complete charging of the battery, is used to terminate charging. The batteries are charged from a constant current source, and the charging voltage rises steadily for as long as the cells are capable of converting the supplied energy into chemical energy. When the cells are no longer capable of storing the supplied energy, the supplied energy is converted into heat, and the cell voltage drops. The drop in the cell voltage is used as an indicator to terminate charge. However, fluctuations in the battery voltage caused by surface effects may be erroneously interpreted as a signal to terminate charge. Therefore, premature break-off of the charging operation is often seen when utilizing the negative delta voltage charge mode. Another problem with negative delta voltage charge mode is that with low rates of charge, the battery does not experience a negative delta voltage in the end of charge. Additionally, Nickel-Metal Hydride batteries do not have the pronounced charging voltage curves seen in Ni—Cd batteries, and as a result, are often overcharged using the negative delta voltage charge mode.

In the positive delta voltage or delta voltage/delta time mode (dV/dt), the slope of the voltage charging curve is evaluated to determine when to terminate charging of the battery. Theoretically, the rise in the charging voltage decreases when the battery is near full charge. Utilizing a mathematical differential of the charge curve, the reduction in this rise in the charging voltage can be evaluated as the criteria for terminating charging. This method suffers from the fact that the difference in the rise may not be dramatic enough to cause termination of the charging at a proper time with ensuing overcharge of the battery. Additionally, due to fluctuation in the charging curve, this first order derivative charging method may terminate charging prematurely.

The methods described above are based, at least in part, upon the phenomena associated with oxygen production on the nickel oxide electrodes and oxygen consumption at the cadmium electrode (or complementary electrode). Oxygen production causes voltage to peak and creates inflection points. Oxygen consumption is responsible for heat generation and the decrease of internal impedance, resulting in a decrease in charging voltage. The accompanying rise in temperature can also be used for charge termination. One of the problems with relying on oxygen production as an indicator of charge termination is that oxygen production causes voltage peak and inflection points. To overcome this problem, it has been described in the related art to use certain open circuit voltage parameters as indicators of charge termination.

Pulse charging utilizes a high current charge followed by an interruption period. The interruption period allows the voltage of the battery to be determined during a currentless phase or under open circuit voltage conditions (OCV) in order to determine the open circuit voltage of the battery ($V_{OCV}$).

U.S. Pat. No. 5,477,125, which is hereby incorporated herein by reference in its entirety, proposes a method of recharging a battery that comprises the steps of periodically interrupting the charge current, sampling the resistance free voltage ($V_o$) after the delay period, and determining the point or points on the $V_o(t)$, $dV_o/dt$ and $d^2V_o/dt^2$ curves to detect points indicative of charge termination. The current measuring periods are repeated every 10 seconds, and a delay period after current interruption is used to allow the battery to reach an equilibrium. This reference utilizes a pre-set VREF and this may result in a large degree of error due to the fact that the battery rate of charge and design criteria are not generally accounted for when selecting $V_{REF}$.

Each of the above-described open circuit monitoring techniques suffer from the disadvantage that they do not precisely indicate the point or points necessary for charge termination. To prevent overcharge more accurately, it is necessary to measure and detect a relatively small change in open circuit voltage (i.e., 30–40 mV) and detect a relatively large change in absolute charging voltage (i.e., 8–9V). Use of the above described charging schemes normally does not recognize such a small change in open circuit voltage. Often, with the charging techniques of the related art, such a small change cannot be recognized above the "noise" or artifacts of the charging process.

SUMMARY OF THE PRESENT INVENTION

This invention relates to an improved charging device for rechargeable batteries and cells. More particularly this invention relates to an improved battery charger capable of rapid and "gentle" charging such that adverse overcharging conditions are substantially avoided.

This invention also generally relates to a method of charging a rechargeable battery by which charge termination is signaled by voltage values sampled under open circuit voltage conditions. Open circuit voltage is sampled, compiled and analyzed periodically. Open circuit voltage is monitored for a change or inflection in chemical polarization voltage derived from the $V_{OCV}$ versus time data. This method allows the battery to be more fully charged without terminating charging too early or too late due to false readings. This, in turn, enables the battery to be more fully charged quickly and safely.

Specifically, the present invention provides a method of charging a rechargeable battery which includes the steps of sampling an open circuit voltage $V_{OCV}$ of the battery; compiling values for the open circuit voltage $V_{OCV}$ with respect to charging time t elapsed; analyzing the compiled values for $V_{OCV}$ and t to identify the $V_{OCV}$ point which indicates a need to adjust or terminate the charging current; continuing charging if the $V_{OCV}$ point is not identified; and adjusting or terminating the charging current if the predetermined $V_{OCV}$ point is identified. The information provided by and derived from measurement of the $V_{OCV}$ is a function of time ($V_{OCV}(t)$), may be an inflection point in the first order differential data ($dV_{OCV}/dt=0$), a transition point in the second order differential data ($d^2V_{OCV}/dt^2=0$), a negative slope in the $V_{OCV}(t)$ data, a drop in the chemical polarization over time ($-dV_{CP}/dt$), and/or a function of any combination of the above points. This information indicates the need to adjust or terminate charging. Chemical polarization can be derived from $V_{OCV}$ data. Chemical polarization is responsible for a decrease in voltage as soon as oxygen is consumed on the negative electrode chemical polarization falls as heat production from oxygen consumption rises. Thus, detection of decreasing chemical polarization or $-dV_{CP}/dt$ is very useful in determining when to terminate charge. If a change in chemical polarization is not recognized, then charging is continued until such a point or points are identified.

When charging has been terminated, generally a trickle charge may be supplied to the battery to maintain the battery in a fully charged condition. The trickle charge can be a continuous constant current charge at a low (about C/20) rate, or alternatively, a much larger trickle rate in pulsed duration may be used to prevent formation of larger crystals on the electrodes. In this case, although the pulsed trickle charge is supplied at a much higher rate, when the duration of the high current rate is factored in, the average current charge is maintained within the desired limits.

A battery charger which accomplishes the methodology discussed herein is provided. It includes a power supply to provide charging current; a charge interrupter for periodically interrupting the charging current in order to sample the open circuit voltage; a power manager to adjust the charging current when a point or points indicating the need to adjust the current are identified; a voltage detector or microcontroller for sampling, compiling and analyzing $V_{OCV}$ with respect to time elapsed to identify a point indicating either a need to adjust the current, the onset of oxygen production, or the onset of overcharge. The battery charger may also optionally include a thermistor or temperature sensor for measuring the temperature of the battery. A temperature comparator such as a microprocessor to compare and calculate temperature data is optional, but not necessary in the preferred embodiment of the present invention. The power manager may also be used to supply a trickle charge to the battery upon termination of the charging current. The microprocessor can also be used to switch the charging current to a second battery when charging to a first battery has been interrupted or terminated. The microprocessor may be utilized to combine, compile, analyze and determine the preferred rate of charge for the battery. Temperature (optional), current and voltage sensors provide communication and data between the battery and microcontroller.

The present invention is directed to a battery charger and a method of charging a rechargeable battery, specifically Ni—Cd (Nickel-Cadmium) batteries, Ni—H$_2$ (Nickel-Hydrogen) batteries, and Ni—MeH (Nickel-Metal Hydride) batteries which are capable of accurately detecting a point indicative of either charge adjustment or termination. The battery charger itself comprises a power supply to provide charging current to the battery, a charge interrupter for periodically interrupting the charging current, a voltage sensor for sampling a voltage of the battery, a data compiler for compiling and analyzing the voltage values to identify a voltage point or points indicative of adverse conditions within the battery, a charging current adjuster for either adjusting or terminating the charging current when the voltage points indicative of adverse conditions within the cell are identified. The voltage sampler is capable of sampling charging voltage and open circuit voltage at a plurality of points and preferably feeds this information to a microprocessor or data compiler.

The voltage sensor samples open circuit voltage values during a plurality of currentless phases to derive information regarding chemical polarization within the battery. As will be discussed more fully herein, a negative slope ($-dV_{CP}/dt$) chemical polarization on a chemical polarization curve provides an accurate indicator of whether it is necessary to terminate charging. The voltage sampler samples the steady open circuit voltage $E_e$ periodically and feeds this information to the microprocessor or comparator to identify a point that indicates that the battery is fully charged and is about to enter a state of overcharge. To avoid overcharge, the present invention charges the battery with constant current (or hysteresis charging at an equivalent capacity) and terminates the charging current as soon as a predetermined level of voltage, identified by a drop in chemical polarization, is reached.

During charging, if one of the points indicating overcharge is identified, charging is adjusted; otherwise charging is continued. Voltage is sampled periodically during charging. To obtain steady open circuit $E_e$ and chemical polarization voltage $V_{CP}$, the open circuit voltage of the battery is sampled during currentless phases. If the open circuit voltage is sampled 5 ms after the charging current is interrupted and preferably closer to 5 seconds (5,000 ms) after the charging current is interrupted, a quasi-stationary or steady open circuit voltage $E_e$ can be obtained. The difference between $E_e$ and $E_i$ is obtained. $E_i$ is the initial open circuit voltage obtained as soon as charging is interrupted, normally during the same currentless phase period, sampled within the range of 1–5 ms, and is used for proper calculation of a chemical polarization value, $V_{CP}$. Monitoring $V_{CP}$ over a pre-determined period of time provides the slope of $V_{CP}$ versus time ($dV_{CP}/dt$). Although it is preferable to utilize a negative change in the chemical polarization slope ($-dV_{CP}/dt$) as an indicator of the onset of overcharge, it may be possible to simply use a change in chemical polarization $\Delta V_{CP}$ as an indicator of charge condition, and more preferably for recognition of battery type.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

Figure 1:
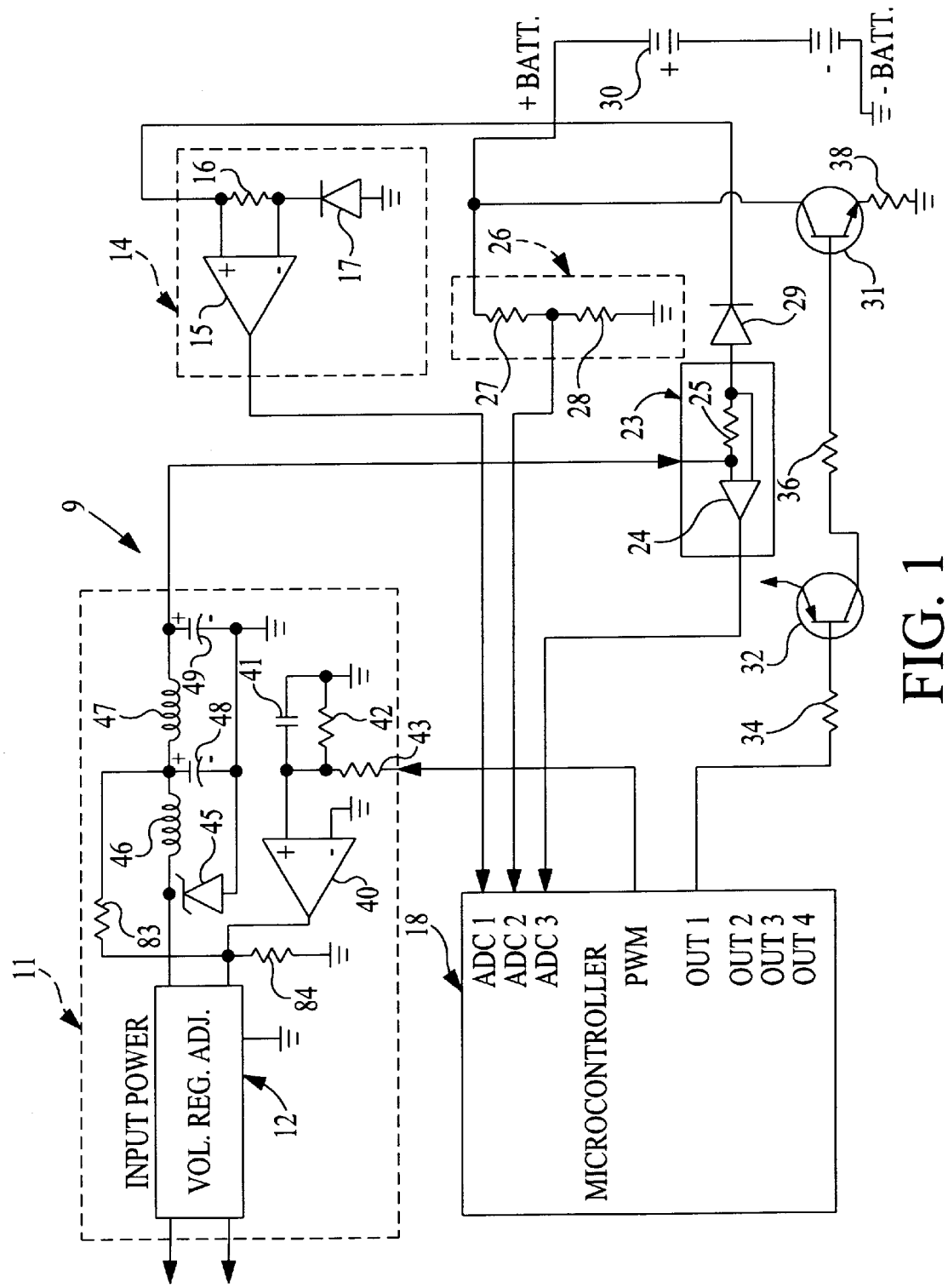
FIG. 1 illustrates a schematic circuit diagram for the preferred embodiment of a battery charger according to the present invention.

It should be noted that in the detailed description which follows, identical components may have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

The battery charger and method of recharging batteries disclosed herein focuses on Nickel-based cells. Although the terms battery and cell can be used interchangeably herein, a battery consists of one or more cells connected in series, or in parallel, or both depending on the desired output voltage and capacity of the battery. The cell is the basic electrochemical unit and consists of the anode, cathodes, and electrolyte. When a full state of charge is discussed herein, it is to be understood that the battery or cell being charged has reached nearly 100% of the capacity of stored energy, measured in ampere-hours. The rechargeable battery 10 can be any secondary battery or rechargeable battery and preferably for purposes of this invention is a Nickel-Cadmium battery or Nickel-Metal Hydride battery. A 1C charge theoretically provides a full charge in one hour. However, the principles of the present invention can be extended to include other types of rechargeable batteries.

FIG. 1 illustrates a schematic circuit diagram for the preferred embodiment of the present invention. Battery charger 9 is comprised of the necessary elements for achieving the method described herein, and includes a power manager 11 connected to a power supply (not shown). Microcontroller 18 is utilized to control the power manager 11 and receive information through a first voltage feedback circuit 14 from a second voltage feedback circuit 26 and from current feedback circuit 23. Microcontroller 18 is typically comprised of analog/digital converters ADC1, ADC2, ADC3, software or hardware based pulse width modulator (PWM), input/output (I/O) ports OUT1, OUT2, OUT3, OUT4, read only memory and timers. Output voltage is controlled by microcontroller 18 and fed to power manager 11. The output control voltage is filtered by resistors 42 and 43 and capacitor 41 and through the operational amplifier 40 which is fed to the power manager 11. Using the voltage at the output of operational amplifier 40, first resistor 83 and second resistor 84, the adjustable voltage regulator 12 sets the voltage at diode 45. Inductors 46 and 47, capacitors 48 and 49, and diode 45 are used to filter the voltage. Current feedback is derived by measuring the voltage across shunt 25 by operational amplifier 24. Diode 29 prevents the introduction of voltage from a rechargeable Nickel battery from being fed back into the charger 9. Voltage feedback from the cells of the battery 30 is provided by voltage feedback circuit 14, comprised of a shunt 16, zener diode 17 and operational amplifier 15. Since zener diode 17 is used, the feedback voltage from the cells of the battery 30 will not be full scale (zero to the battery's maximum voltage) but will be the scale of the zener diode's 17 voltage to the battery's maximum voltage. Voltage feedback from the cells of the battery 30 is provided by voltage feedback circuit 26 comprised of resistors 27 and 28 which form a voltage divider. Transistors 31 and 32 equalize the cells of the battery 30 and support designated current through the battery. The transistors 31 and 32 are under the control of the microcontroller 18. A temperature detector (not shown) or sensor may be utilized to measure the temperature, T, of the battery. Although not critical to the present invention, the temperature detector may be useful as a safety mechanism to prevent explosive reactions from taking place. The collected information is fed to a microcontroller 18 which can in turn signal adjustment or termination of the charging current of power manager 11. The microcontroller 18 is used to run and monitor the operation of the battery charger 9 and to compile and analyze the charging voltage values to identify the end of charging, the onset of shunting, the onset of electrolyte decomposition, and unequal states of charge between the cells of the battery 30. The microprocessor 18 will signal termination of the charging current if the potential shunting is identified or if charging is complete. A data compiler may or may not be integrated into microcontroller 18 and may function to compile the charging and open circuit voltage information to thereby minimize the microprocessor time dedicated to this task. Battery charger 9 is precise enough to measure the open circuit voltage within 1 ms of charge interruption to thereby obtain information regarding both the ohmic and chemical polarization components of the cell or battery. The limitation of 1 ms is adequate for measuring the necessary open circuit voltage data points in the present invention.

Figure 2:
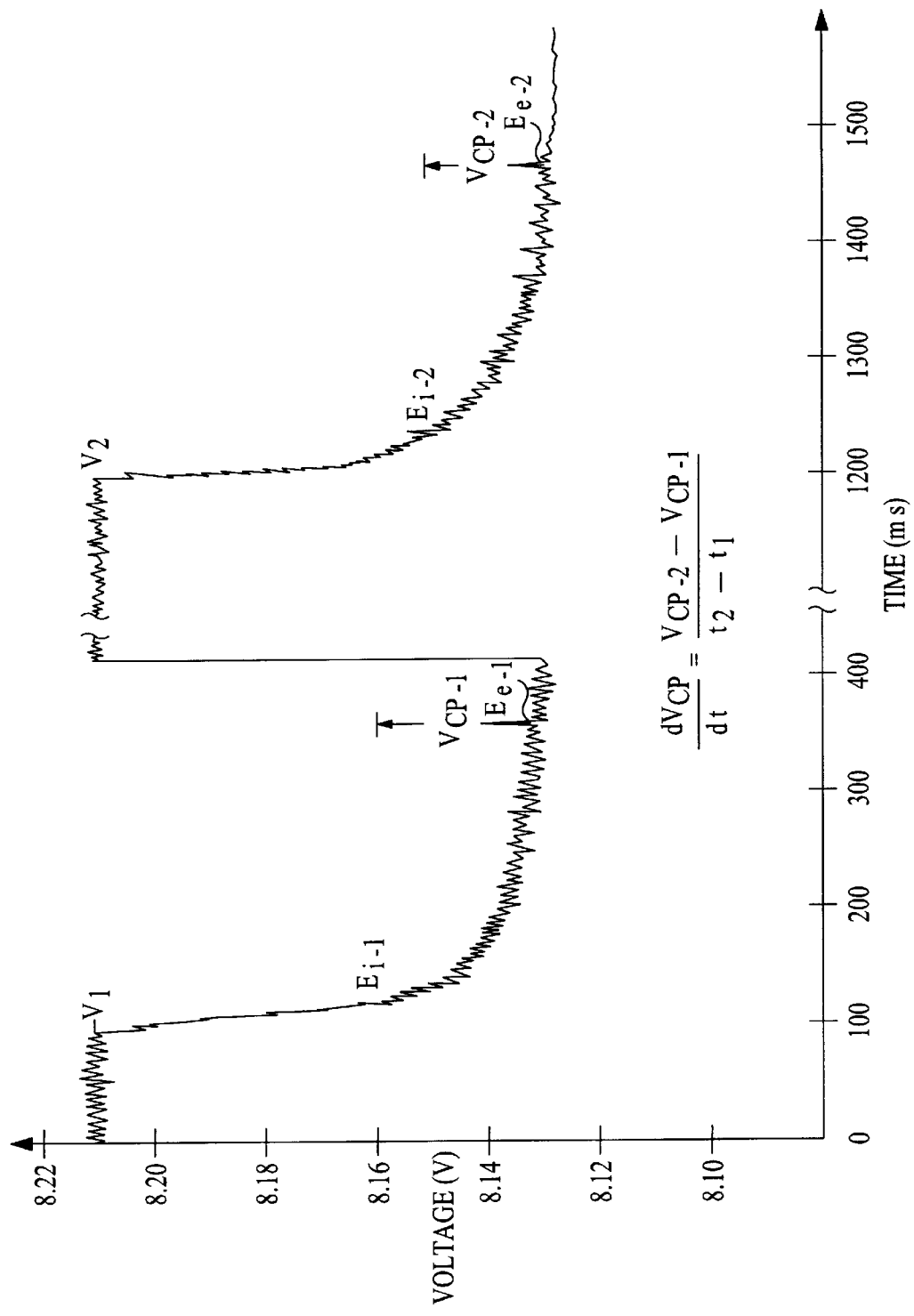
FIG. 2 is a graph illustrating the derivation of $dV_{CP}/dt$ and $\Delta V_{CP}$.

FIG. 2 illustrates the importance of understanding the voltage components that are present in a battery when the current is interrupted to measure the open circuit voltage $V_{OCV}$ of the battery. As can be seen from FIG. 2, both chemical and electrical phenomena must be taken into consideration.

This invention proposes a procedure for control of conditions associated with formation of oxygen on the negative electrode. Indeed, the expression for battery charging voltage can be written as follows.

$$V = E_e + I(R_{CP} + R_\Omega) \quad (1)$$

where V is the battery voltage, $E_e$ is the steady open circuit voltage, $R_{CP}$ is the chemical resistance due to chemical polarization and $R_\Omega$ is the ohmic resistance due to the ohmic components of the battery. The chemical resistance includes the electrochemical and diffusion increments of polarization of the electrode and the electrolyte.

The steady or quasi-steady open circuit voltage $E_e$ includes the polarization in solid phase of the transition metal oxide electrode. Equation (1) can be rewritten in terms of overvoltage as:

$$V = E_e + V_{CP} + V_\Omega \quad (2)$$

where $V_{CP}$ is the voltage due to chemical components of the cell and $V_\Omega$ is the voltage due to the ohmic component of the cell. $V_\Omega$ is associated with cell resistance and disappears almost immediately after current interruption. From FIG. 2, it can be seen that $V_{CP}$ ($V_{CP-1}$ in FIG. 2) is the difference between the open circuit voltage in the initial moments after current interruption, $E_i$ (i.e. $E_{i-1}$ in FIG. 2) and steady open circuit voltage, $E_e$ (i.e. $E_{e-1}$ in FIG. 2). Thus, $V_{CP}$ drops if oxygen is reduced on the negative electrode.

Initial open circuit voltage, $E_i$, is the sum of the chemical component $V_{CP}$ and the "steady" open circuit voltage $E_e$ of the battery and to some extent an ohmic component $V_\Omega$. However, the ohmic component, $V_\Omega$, dissipates so rapidly, that in the range of 1 to 5 ms after current interruption, $E_i$ consists primarily of chemical polarization, $V_{CP}$, and steady open circuit voltage $E_e$. Accordingly, it is preferable to sample the initial circuit voltage, $E_i$, of the chemical component of the voltage, $V_{CP}$, as quickly as possible within the range of 1–1,000 ms, most preferably within the range of 1–5 ms after current interruption. After 500 ms, the open circuit voltage can be considered substantially free of both the ohmic and chemical components of the battery. The minimum amount of time that should pass after current interruption to sample V is in the range of 5–1,000 ms because this is generally the time interval necessary for the chemical polarization component to dissipate and the open circuit voltage to become substantially stationary.

Figure 4:
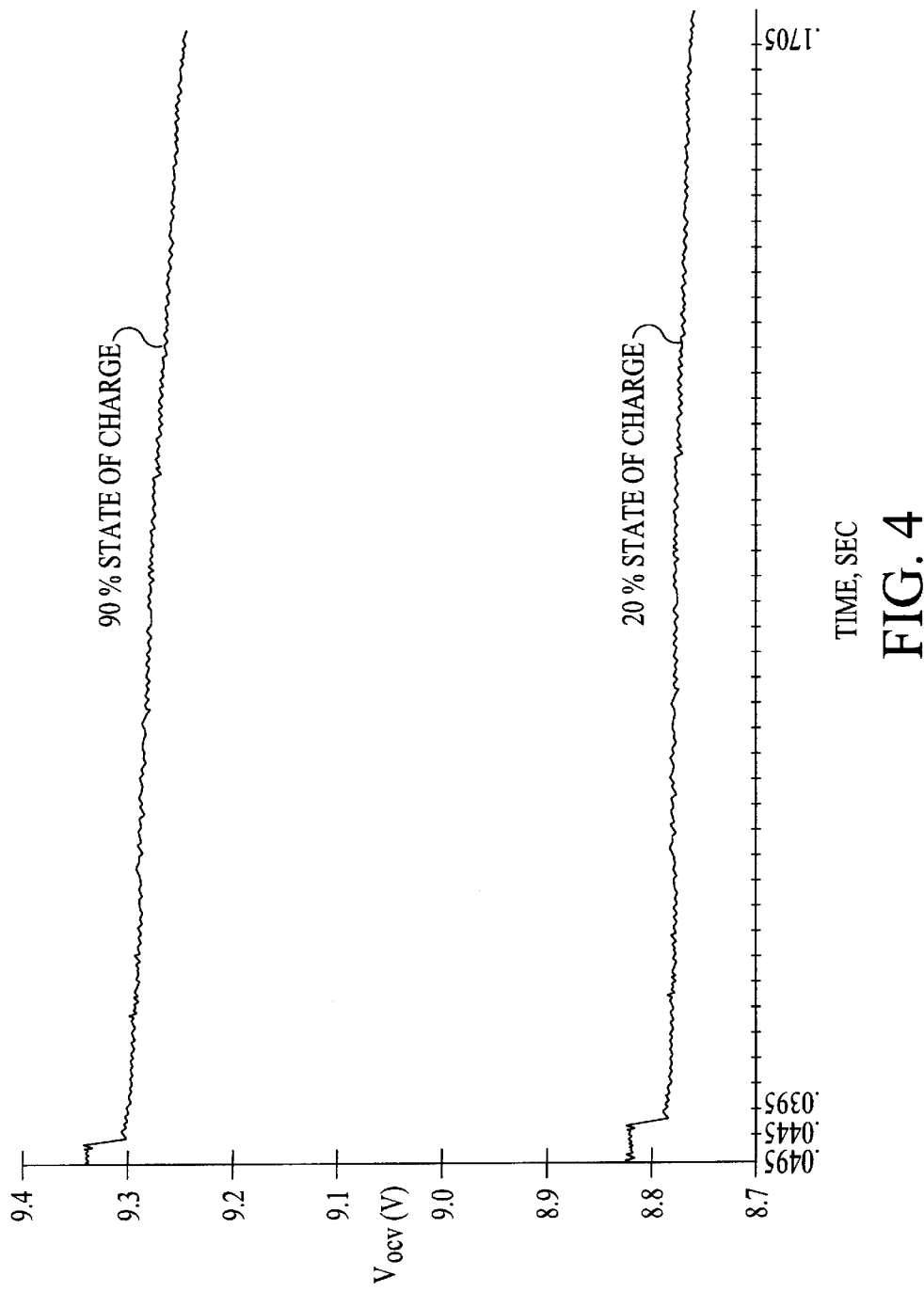
FIG. 4 is a graph illustrating the difference in the circuit voltage for a battery at different states of charge.

In Nickel-based batteries, the battery open circuit voltage value continues to drop on the order of hours after charge termination. This phenomenon is associated with the unsteady processes on the nickel oxide electrode. However, approximately 500 ms is a reasonable time after which chemical polarization has stabilized. The stationary value of open circuit value $E°_{OCV}$ is equal to 1.31/V for a Nickel-Metal Hydride battery and 1.29/V for a Nickel-Cadmium battery. After 100 ms, chemical polarization and related voltage, $V_{CP}$, substantially disappears. When using a high rate of charge, the chemical polarization disappears approximately 180 ms after charge termination. The oscilligram of FIG. 4 confirms that an interval of 100–500 ms adequately covers the time necessary to measure the change in chemical polarization. As can be seen from FIG. 4, the chemical polarization disappears after 100 ms for a low state of charge and after 180 ms of continuous current interruption, chemical polarization almost disappears for a high state of charge. The actual transient time will depend on battery design, state of charge, and temperature.

In practice, the cycle illustrated in FIG. 2 allows us to obtain the chemical polarization voltage value $V_{CP}$ by means of sampling the open circuit voltage value at the beginning and the end of the rest period. Thus, with an oscilligram, one can easily detect when it is necessary to terminate charging. In this test, a 7.2 volt Nickel-Cadmium battery with a rated capacity of 1.6 Ah was used. The time interval which is covered is 10 ms immediately proceeding current interruption and 200 ms following current interruption. The battery contained six sonyo production/cylindrical cells. From FIG. 3, it can be seen that the chemical polarization voltage that is the difference between $V_{OCV}$ at $E_i$ and $V_{OCV}$ at $E_e$ provides a much more accurate indicator of charge due to the exaggerated inflection point.

$V_{CP}$ is actually the summary of overvoltages for chemical processes occurring at the positive and negative electrode. $V_\Omega$ and $E_e$ are derived essentially independent of temperature, whereas $V_{CP}$ is dependent on the temperature of the cell. As soon as oxygen is consumed on the negative electrode and produces heat there will be a corresponding drop in chemical polarization. This is due to the fact that oxygen reduction is associated with heat generation, per the following formula:

$$W = VI - E^T I + E^T I_o \quad (3)$$

where V is the charging voltage, $E^T$ is the thermoneutral potential (1.45V for NiCd; 1.35V for NiMeH) or enthalpy and $I_o$ is the current of oxygen production (or conversely consumption). Since the stable open circuit value for NiCd (1.29V) and NiMeH (1.31V) are known, the difference between the thermoneutral potential and the stable open circuit voltage ($E°_{OCV} - E^T$) is proportional to the cell's entropy. For a Nickel-Metal Hydride battery, the product of the entropy referred to as one coulomb is equal to 0.04V and for Nickel-Cadmium batteries, the entropy value is equal to 0.16V.

As seen in FIG. 2 since $E_e$ is measured after the chemical component has dissipated, we can obtain the chemical component of the first sampled voltage by:

$$V_{CP} = V_1 - V_{\Omega-1} - E_{e-1} \quad (4)$$

where $V_1$ is the first sampled charging voltage, $V_{\Omega 1}$ is the first sampled ohmic component and $E_{e-1}$ is the first sampled steady open circuit voltage. The difference between $V_1$ and $V_{\Omega-1}$ is equal to $E_{i-1}$. Although, as seen in FIG. 2 the open circuit voltage at 275 ms is not truly steady, as long as the later sampled steady open circuit voltage $E_{e-2}$ is measured at the same time interval after interrupting the charging current there should not be a substantial impact on $V_{CP}$ since $V_{CP}$ will be normalized.

The same sequence of events is repeated for the next measurement period wherein $V_2$ is the later sampled charging voltage, $V_{\Omega-2}$ is the later sampled ohmic component, and $E_{e2}$ is the later sampled steady open circuit voltage. It can be seen that both slope $dV_{CP}/dt$ information and the recognition of a difference $(E_e-E_i)$ can be obtained from these samples. Accordingly, it is preferable to measure $d(E_i-E_{e1})/dt$ value and compare this with $d(E_{i2}-E_2)/dt$ to obtain or recognize an inflection point value. It can be recognized that a rise in diffusion resistance results in an increase in the chemical polarization, $V_{CP}$.

Figure 3:
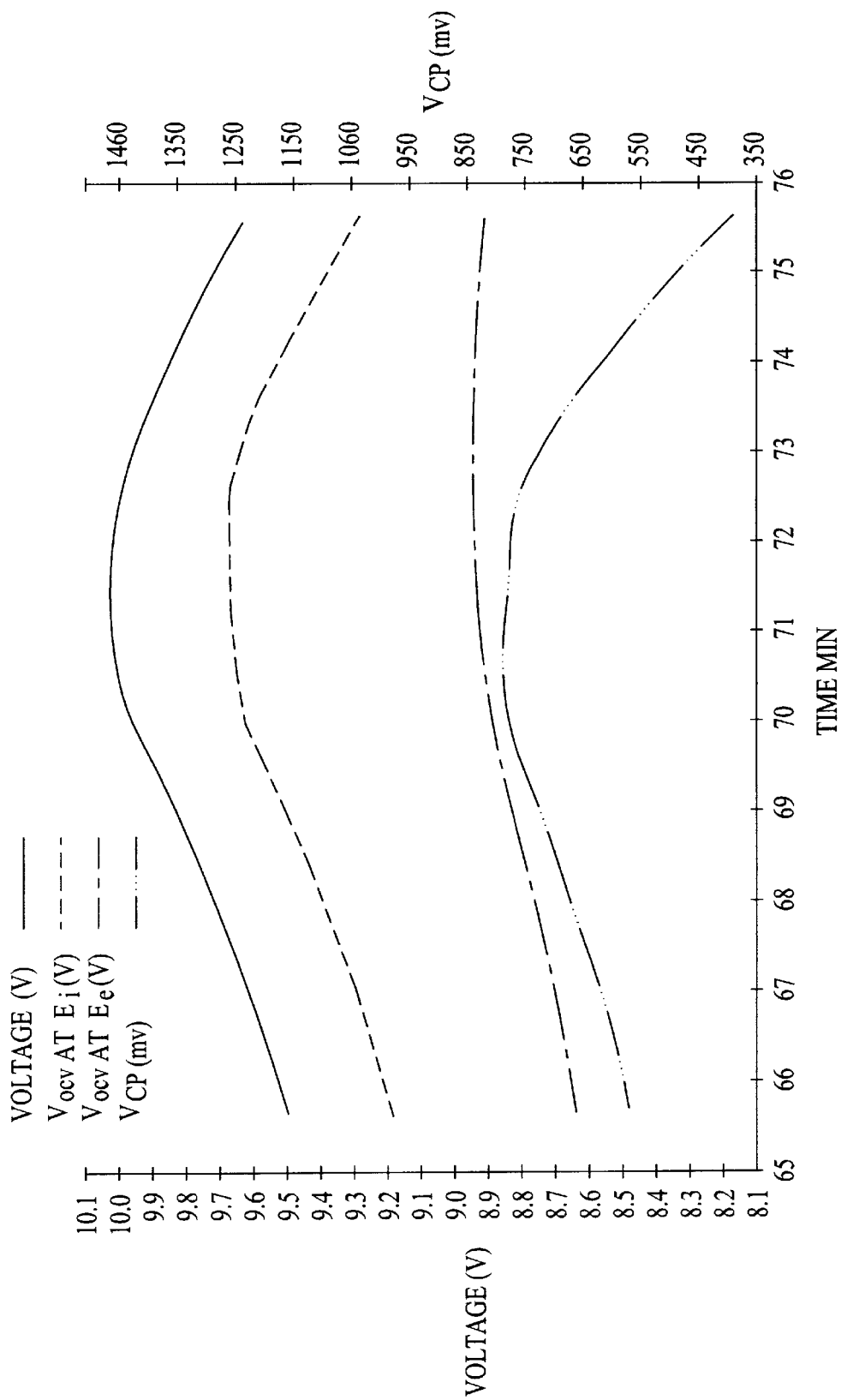
FIG. 3 is a graph illustrating the increased accuracy when utilizing $dV_{CP}/dt$.

A significant drop in the chemical polarization slope is utilized. Preferably, the significant drop is at least a two- to ten-fold decrease over the previously derived $dV_{CP}/dt$. Even more preferable is a four-fold decrease, and most preferably greater than a five-fold decrease over the previously calculated $dV_{CP}/dt$. Alternatively, experience with a particular type of battery allows one to select a predetermined decrease in chemical polarization voltage over time $dV°_{CP}/dt$ that, when exceeded, indicates that there is a potential for overcharge. In this case such a decrease could be in the range of 10–12 mV/min. A dramatic drop in $dV_{CP}/dt$ is seen in FIG. 3 shortly after 72 minutes of charging. Thus, the preferred methodology of charging includes the use of a drop in $dV_{CP}/dt$ as a signal to terminate charging. From FIG. 3 it can be seen that a drop which exceeds about 100 mV/min is indicative of adverse charging conditions. More narrow ranges also may be used. For example, in FIG. 3, a drop of about 50 mV/min, and more preferably, a drop of about 25–50 mV/min, depending on battery design and type, as well as desired state of charge or overcharge can be manipulated. As used in this disclosure, the term "about" means +/-10% of a numerical value, i.e., about 50 mV means 45 mV to 55 mV.

In FIG. 2, the rechargeable nickel battery is initially charged at a current near the capacity of the battery (i.e., in the range of 0.75–1C–A,1C where capacity theoretically provides a full charge to the battery in one hour). This charge is provided with a pulse duration which equals approximately 20 s and is filtered by a currentless period of about 280 ms. $E_i$ is sampled after 2 ms from the beginning of the rest period and $E_e$ is sampled in the end of the rest period (near 280 ms). The chemical polarization is derived from the difference between values $E_i$ and $E_e$, $(E_i-E_e)$. The preferred charging profile would contain a 1.8 A charge pulse with a duration of 30 s with a 2 s rest period for measurement of the chemical polarization voltage value, $V_{CP}$.

Figure 5:
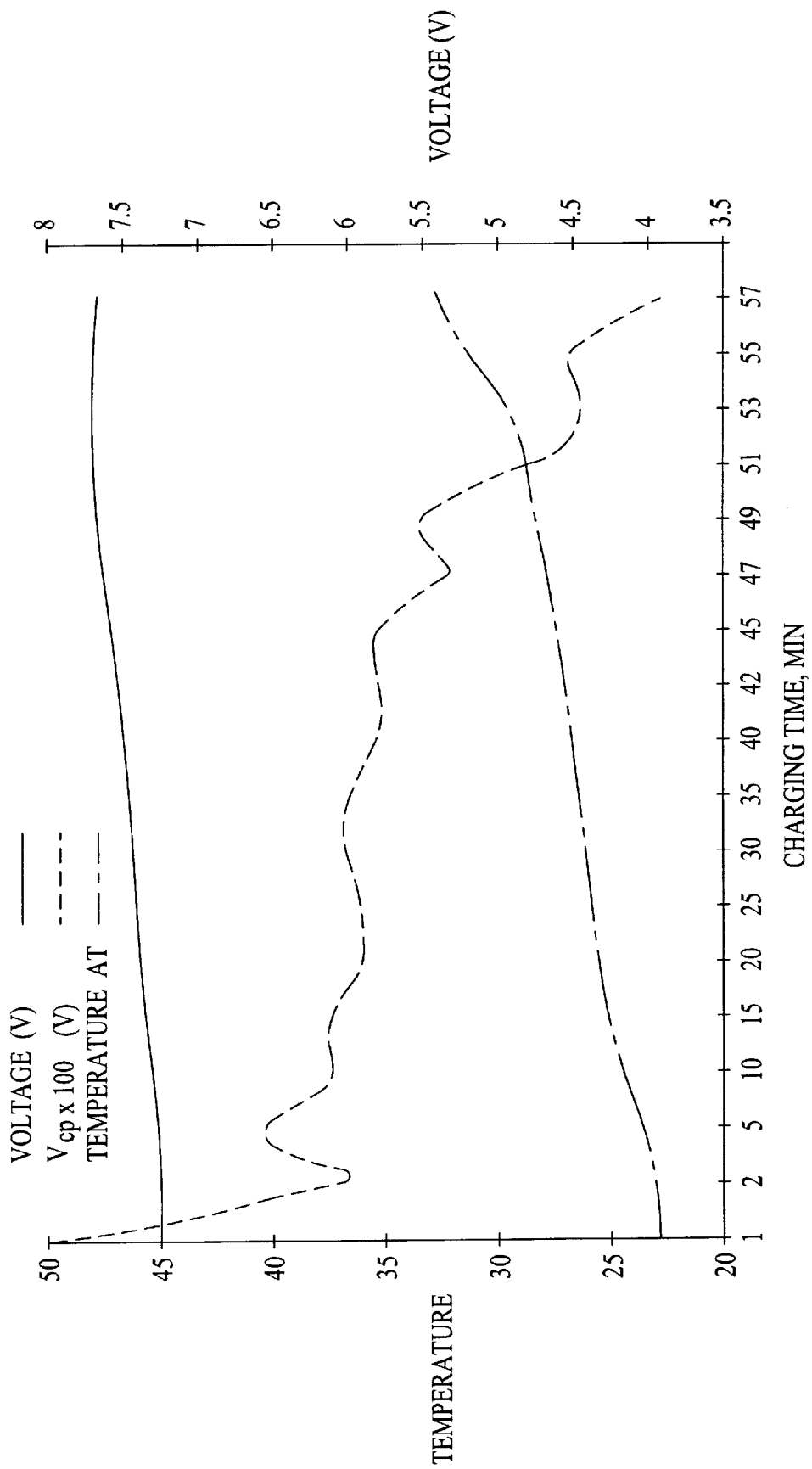
FIG. 5 is a graph illustrating three different parameters monitored during the charging process (temperature, voltage, and chemical polarization, $V_{CP}$).

FIG. 5 illustrates that the magnitude of a $V_{CP}/dt$ will depend on battery type and design. The chemical polarization change over time for a Ni—MeH battery is illustrated in FIG. 5. In the prismatic metal hydride cell used to generate FIG. 5, there is much less of a dramatic shift of the chemical polarization over time than seen in a Ni—Cd battery used to generate FIG. 3. The prismatic metal hydride cell experiences much less of a shift in chemical polarization drop than the cylindrical cell. This phenomena is believed to be associated with a higher overvoltage requirement for the electrochemical reaction on the cadmium electrode of the Ni—Cd cell when compared with the metal hydride electrode resulting in a much more exaggerated impact on chemical polarization voltage value $V_{CP}$ by oxygen. This result may be very important in detecting the type of battery being charged. The Ni—MeH battery has a much less dramatic shift in chemical polarization than does the Ni—Cd battery. For example, in FIG. 3, a Ni—Cd design, a $\Delta V_{CP}$ and a $dV_{CP}/dt$ of 100 mV of 100 mV/min can be observed. However, as can be seen from FIG. 5, for a Ni—MeH battery, a change in chemical polarization of only about 40 mV occurs during the first 57 minutes of charging. The fact that there are substantial differences in the change in chemical polarization between battery design types can be incorporated into the battery charger and methodology of charging of the present invention in a number of ways. For example, a change in chemical polarization $\Delta V_{CP}$, whether it be an absolute charge ($|\Delta V_{CP}|$), a negative charge ($-\Delta V_{CP}$), a positive charge ($+\Delta V_{CP}$), an absolute change over time ($|dV/dt|$), a positive change over time ($+dV_{CP}/dt$), or a negative change over time ($-dV_{CP}/dt$) may be used to determine the chemistry of the battery being recharged. In the examples provided, that is the Ni—Cd battery of FIG. 3 and the Ni—MeH battery of FIG. 5, a positive $dV_{CP}/dt$, a $\Delta V_{CP}$ exceeding about 40 mV, a negative slope $-dV_{CP}/dt$ exceeding about $-10$ mV/min, a $|\Delta V_{CP}|$ of about 40 mV or greater, and a $|dV_{CP}/dt|$ exceeding 10 mV are all characteristic of a Ni—Cd battery. Thus, the differences in shifts of chemical polarization may be incorporated in the design of a battery charger in order to allow the battery charger to determine different designs and types of cells.

Although the preferred embodiments have been described in detail, it should be understood that the various changes, substitutions and alterations can be made without departing from the spirit and scope of the invention as defined by the appended claims. Specifically, combining one or more of the methods of charge termination and method of chemistry type recognition in a battery charge or a method of charging a battery is within the scope of the claims.

What is claimed is:

1. A method of charging a rechargeable battery comprising:

charging the battery with a charging current;

interrupting the charging current periodically to create a current-free period;

sampling an open circuit voltage of the battery during the current-free period;

identifying an indicator of adverse charging within the battery, said indicator being a decrease in chemical polarization over time derived from the sampled open circuit voltage;

lowering the charging current if the indicator is identified; and continuing charging with the charging current if the indicator is not identified.

2. The method of claim 1, further including the steps of sampling the charging voltage and identifying a potential adverse charging condition from the sampled voltage.

3. The method of claim 2, wherein the indicator of adverse conditions within the battery is further selected from the group consisting of:

a. charging voltage of the battery exceeding a predetermined maximum voltage of the battery;

b. a drop in open circuit voltage which exceeds a predetermined drop in open circuit voltage;

c. a transition point in a second order differential over time curve of the open circuit voltage;

d. a function of any combination of the above points; and e. a function of any of a–d combined with said decrease in chemical polarization over time.

4. The method of claim 3, wherein the charging current is terminated upon identifying the decrease in chemical polarization.

5. The method of claim 1, wherein the charging current is terminated upon identifying the decrease in chemical polarization.

6. The method of claim 1, wherein the indicator of adverse charging is a pre-determined change in a second order derivative of the open circuit voltage over time.

7. The method of claim 1, wherein the open circuit voltage is sampled at a plurality of time periods during the current-free period.

8. The method of claim 7, wherein a first open circuit point is sampled during said sampling period in a range of 1–5 ms after the charging current has been interrupted and a second point is sampled in a range of 100–1,000 ms after the charging current has been interrupted.

9. The method of claim 1, wherein the decrease in chemical polarization over time is a pre-determined decrease in chemical polarization voltage over time derived from a later sampling period, $dV_{CP-2}/dt_2$, when compared to a chemical polarization voltage over time derived from an earlier sampling period, $dV_{CP-1}/dt_1$.

10. The method of claim 9, wherein the later sampling period occurs within a range of 10–60 s of the earlier sampling period.

11. A battery charger for charging a rechargeable battery or cell comprising:

a power supply to provide charging current to said battery or cell;

a charge interrupter for periodically interrupting the charging current;

a voltage sensor for sampling voltage values of the battery, the sampled voltage values of the battery being utilized to derive chemical polarization voltage, $V_{CP}$, of the battery;

a data compiler for compiling and analyzing the voltage values to identify indicators of a need to adjust charging; and a charging current adjuster for adjusting the charging current when said indicators are identified.

12. The battery charger of claim 11, wherein onset of overcharge is identified by a negative slope on a chemical polarization versus time curve.

13. The battery charger of claim 11, wherein the chemical polarization, $V_{CP}$, of the battery is used as an indicator of the need to terminate the current being provided to the battery.

14. The battery charger of claim 13, wherein the indicator indicates an onset of overcharge.

15. A battery charger capable of recognizing what type of battery is being charged, comprising:

a power supply to provide charging current to said battery;

a charge interrupter for periodically interrupting the charging current;

a voltage sensor for sampling open-circuit voltage values of the battery, said sampled voltage values of the battery being utilized to derive a chemical polarization voltage, $V_{CP}$, of the battery; and a data compiler for compiling and analyzing voltage values to identify indicators of the type of battery being charged.

16. The battery charger of claim 15, wherein the type of battery is recognized by an indicator selected from the group consisting of a change in chemical polarization, ($\Delta V_{CP}$), a change in chemical polarization over time ($dV_{CP}/dt$), and a derivative thereof.

17. The battery charger of claim 16, wherein the type of battery is identified by a negative slope or value on a chemical polarization versus time curve.

18. The battery charger of claim 17, wherein the type of battery capable of being recognized is selected from the group consisting of Nickel-Metal Hydride, Nickel-Cadmium, and Nickel-Hydrogen.

19. The battery charger of claim 16, wherein the type of battery is a nickel cadmium battery, said nickel cadmium battery being indicated by an indicator selected from the group consisting of:

a. a positive $dV_{CP}/dt$;

b. a $\Delta V_{CP}$ exceeding about 40 mV;

c. a negative slope $-dV_{CP}/dt$ exceeding about $-10$ mV/min;

d. a $|\Delta V_{CP}|_{of\ about}$ 40 mV or greater;

e. a $|dV_{CP}/dt|$ exceeding 10 mV; and f. a combination of any one or more of the foregoing.

* * * * *